(12) United States Patent
Visser

(10) Patent No.: US 8,780,716 B2
(45) Date of Patent: Jul. 15, 2014

(54) SYSTEM AND METHOD FOR SERVICE ASSURANCE IN IP NETWORKS

(75) Inventor: Lance Arnold Visser, Dallas, TX (US)

(73) Assignee: Netsocket, Inc., Plano, TX (US)

( * ) Notice: Subject to any disclaimer, the term of this patent is extended or adjusted under 35 U.S.C. 154(b) by 106 days.

(21) Appl. No.: 12/209,909

(22) Filed: Sep. 12, 2008

(65) Prior Publication Data
US 2009/0067423 A1 Mar. 12, 2009

Related U.S. Application Data

(60) Provisional application No. 60/971,806, filed on Sep. 12, 2007.

(51) Int. Cl.
*H04J 1/16* (2006.01)
*H04L 12/56* (2006.01)
*H04L 12/70* (2013.01)

(52) U.S. Cl.
CPC ......... *H04L 47/10* (2013.01); *H04L 2012/5636* (2013.01); *H04L 47/122* (2013.01); *Y10S 379/90* (2013.01)
USPC ............................. 370/232; 709/238; 379/900

(58) Field of Classification Search
CPC .. H04I 47/10; H04I 47/122; H04L 2012/5636
USPC .................................................. 370/229–240
See application file for complete search history.

(56) References Cited

U.S. PATENT DOCUMENTS

| | | | |
|---|---|---|---|
| 4,670,899 A * | 6/1987 | Brody et al. ................... | 455/453 |
| 5,673,263 A | 9/1997 | Basso et al. | |
| 5,854,899 A | 12/1998 | Callon et al. | |
| 6,359,976 B1 * | 3/2002 | Kalyanpur et al. ........... | 379/134 |
| 6,490,452 B1 * | 12/2002 | Boscovic et al. ............. | 455/436 |
| 6,687,245 B2 | 2/2004 | Fangman et al. | |
| 6,839,321 B1 * | 1/2005 | Chiruvolu .................. | 370/230.1 |
| 6,968,192 B2 * | 11/2005 | Longoni ....................... | 455/453 |
| 7,263,552 B2 | 8/2007 | Govindarajan et al. | |
| 7,599,359 B1 | 10/2009 | Croak et al. | |
| 7,627,290 B2 | 12/2009 | Wing et al. | |
| 7,778,393 B2 | 8/2010 | Ethier et al. | |
| 7,843,842 B2 | 11/2010 | Ethier et al. | |

(Continued)

FOREIGN PATENT DOCUMENTS

WO   WO 03 075527 A1   9/2003

OTHER PUBLICATIONS

Braden, R., et al., "Resource ReSerVation Protocol (RSVP)—Version 1 Functional Specification," Standards Track, Sep. 1997, 112 pages.

(Continued)

*Primary Examiner* — Ayaz Sheikh
*Assistant Examiner* — Mounir Moutaouakil
(74) *Attorney, Agent, or Firm* — Slater & Matsil, L.L.P.

(57) ABSTRACT

A system and method for providing service assurance in a data network is provided. Resource control points are positioned throughout a data network, such as an IP data network. The resource control points obtain network topology information and correlates that information with information associated with a particular service session. The resource control points utilize the correlated information to generate quality service records and to provide status information regarding the network topology and particular sessions. The resource control points may further retrieve link and utilization information to control sessions during periods of congestion.

17 Claims, 11 Drawing Sheets

(56) References Cited

U.S. PATENT DOCUMENTS

| | | | |
|---|---|---|---|
| 2004/0190476 A1* | 9/2004 | Bansal et al. | 370/338 |
| 2005/0050246 A1* | 3/2005 | Lakkakorpi et al. | 710/36 |
| 2005/0227699 A1* | 10/2005 | Schreuder et al. | 455/453 |
| 2006/0069779 A1 | 3/2006 | Sundqvist et al. | |
| 2007/0076720 A1* | 4/2007 | Wu | 370/392 |
| 2007/0268827 A1* | 11/2007 | Csaszar et al. | 370/232 |
| 2008/0049746 A1* | 2/2008 | Morrill et al. | 370/389 |
| 2008/0165687 A1* | 7/2008 | Wang | 370/232 |
| 2009/0034512 A1* | 2/2009 | Bantukul et al. | 370/352 |
| 2009/0067423 A1 | 3/2009 | Visser | |
| 2010/0202294 A1* | 8/2010 | Mullendore et al. | 370/235 |

OTHER PUBLICATIONS

"Unlicensed Mobile Access (UMA); Protocols (Stage 3);" Technical Specification, R1.0.4, May 2, 2005, 162 pages.

\* cited by examiner

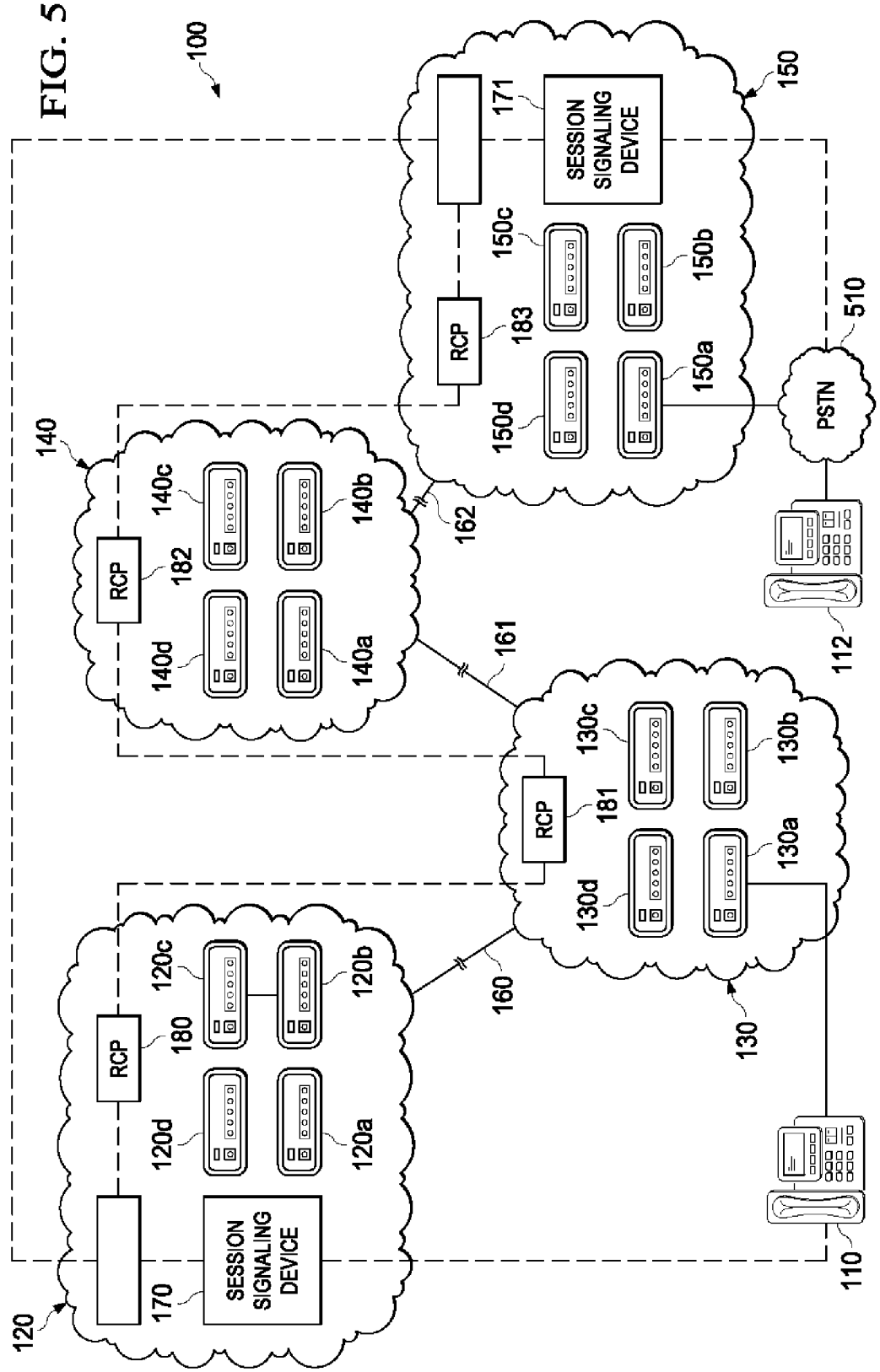

SYSTEM AND METHOD FOR SERVICE ASSURANCE IN IP NETWORKS

This application claims the benefit of U.S. Provisional Application No. 60/971,806 filed on Sep. 12, 2007, entitled "System and Method for Service Assurance in IP Networks," and U.S. application Ser. No. 12/118,270 filed on May 19, 2008, entitled "System and Method for Service Assurance in IP Networks," both of which are hereby incorporated herein by reference.

TECHNICAL FIELD

The present invention relates generally to telecommunications and, more particularly, to a system and method for providing service assurance in data networks.

BACKGROUND

Telecommunications networks in the past have consisted of circuit-switched networks. Generally, circuit-switched networks include multiple network elements communicatively interconnecting a source location and a destination location. A circuit or a static communications path through the multiple network elements is established linking the source location to the destination location. Once the circuit has been established, the source location would be connected to the destination location and communications may be performed there between. The circuit remains established for the duration of the session. These types of sessions would be used for both voice and data, such as voice conversations, facsimiles, data modems, and the like.

Because the circuit is maintained for the entire duration of the session regardless of amount of use, a circuit-switched network may be an inefficient use of the network elements. This is particularly true of some data applications in which the data transmission is bursty. For example, if an application consisted of data being sent from a first user to a second user, who reviews the information and transmits a response back to the first user, a circuit would be maintained even though no information was being transmitted during the time that the second user spent reviewing the information.

In contrast to a circuit-switched network, a packet-based network does not establish a static circuit or communication path between the first location and the second location for the duration of the session. Rather, a packet-based network breaks data into packets, which are then individually sent from the first location to the second location over a network of interconnected network elements and individually routed to their destination. In this manner, the packets may be dynamically re-routed in the event a fault condition is detected on a particular link or on a particular device. The data is then reconstructed from the individual packets at the second (destination) location. In this manner, the resources of the network elements may be used by other sessions or unrelated data traffic when not currently being used to transmit data, thereby allowing a more efficient use of resources than circuit-switched networks.

Some such packet-based networks utilize a transport protocol such as the Internet Protocol (IP) and one such example is the Internet. The Internet, and other data networks, comprises a collection of a collection of interconnected network elements. Data packets are routed from one network element to another based upon routing tables contained in each network element until the packet arrives at the destination. If a network element or a link between network elements fails, then the packet is rerouted through different network elements.

Monitoring the path taken by sessions through the network elements, however, is difficult. Because packet-based networks such as the Internet are simply a collection of interconnected network elements, there is little or no interaction between the network elements other than to route or forward data packets. Any analysis of the network is typically either performed after the fact or done by sending a probe along the path at a particular instant in time. The analysis is neither comprehensive nor dynamic. As a result, it is extremely difficult to detect possible bottlenecks or problems in the network until a problem occurs and to historically reconstruct what occurred within the network at the instant a problem occurred.

As a result, there is a need for a system and method to provide service assurance in a packet-based network, such as IP networks.

SUMMARY OF THE INVENTION

These and other problems are generally solved or circumvented, and technical advantages are generally achieved, by preferred embodiments of the present invention which provides a system and method for providing service assurance in IP networks.

Embodiments of the present invention provide a system and a method for providing service assurance in a data network, such as an IP data network, is provided. One or more resource control points are positioned within each network domain. Each of the resource control points obtains routing and network topology information from the network elements included within the respective network domain. Using the routing and network topology information, the resource control points determine the route packets take throughout the data network and are able to monitor the status of the path taken by the packets. The information may be collected by the resource control points and utilized to provide reports regarding resource management for services within the data network, the path used by the session across the data network, fault information for the session in the context of the network topology and congestion information as concerns the resources in the data network used by the session.

The resource control point, or the resource control point manager, may further gather link utilization information and session information to determine whether or not any particular link is congested. If a determination is made that a link is congested, policy-based rules may be applied to preempt or terminate some of the sessions to relieve the congestion and to ensure that the higher priority sessions are provided adequate resources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a network diagram embodying features of an embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a voice-over-IP (VOIP) application delivering sessions over an IP network. Embodiments of the present invention may also be applied, however, to other applications and communication systems, services, networks, and the like. For example, embodiments of the present invention may be utilized in web-based applications (e.g., HTTP, SOAP/XML sessions), applications exhibiting long-lived sessions, monitoring data traffic tunnels or other data paths in a data network, other packet-based networks, and the like.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
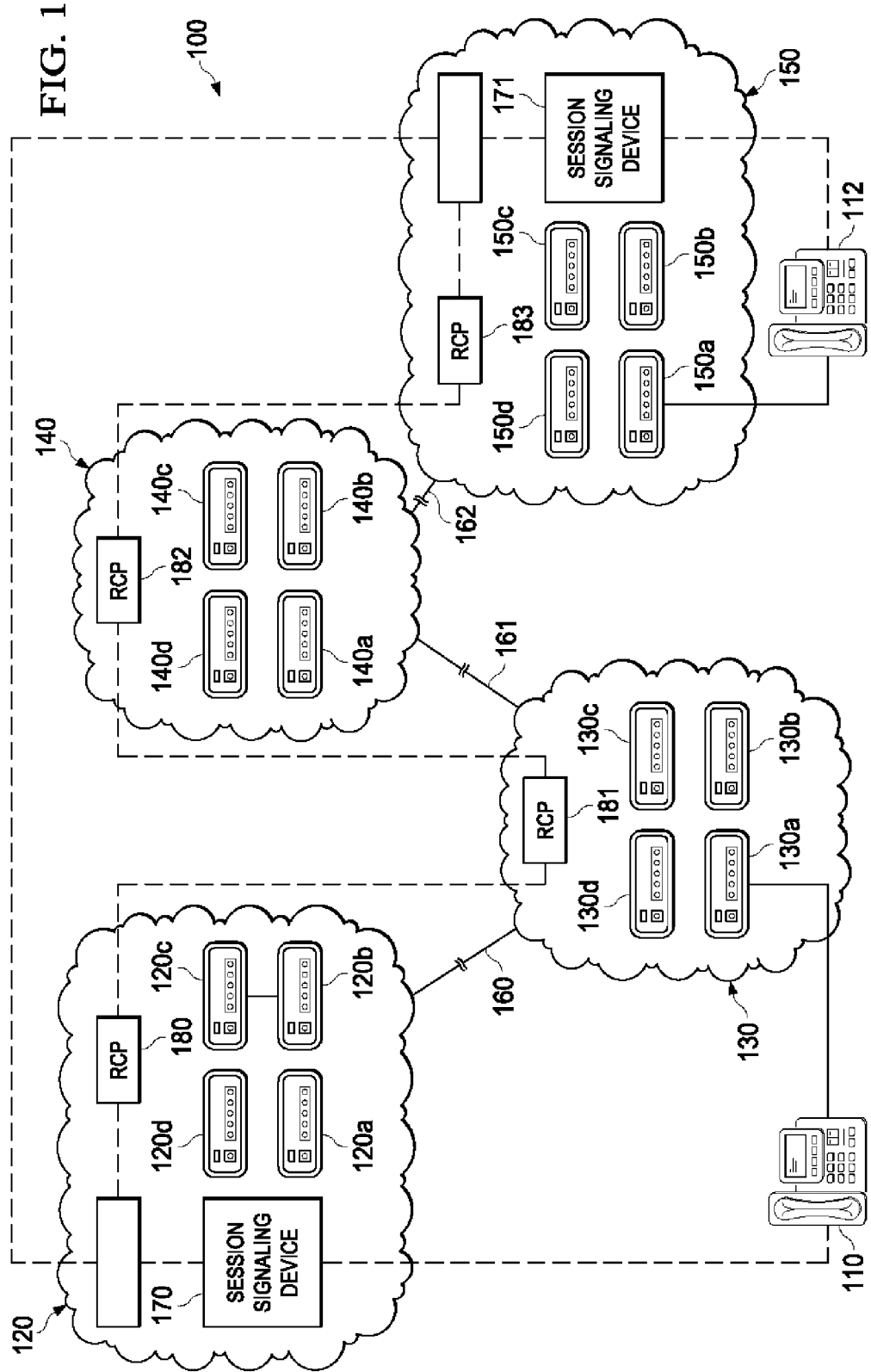
FIG. 1 is a network diagram embodying features of an embodiment of the present invention.

Referring now to FIG. 1, reference numeral 100 designates a network environment embodying features of an embodiment of the present invention. The network environment 100 includes a originating customer device 110 and a terminating customer device 112 communicatively coupled via one or more network domains, such as network domains 120, 130, 140, and 150. Each network domain 120, 130, 140, and 150 comprises one or more network elements, such as network elements 120a-120d, 130a-130d, 140a-140d, and 150a-150d, respectively.

As illustrated in FIG. 1, the network elements within a network domain are interconnected. For example, the network elements 120a-120d contained with the network domain 120 are interconnected to each other. The other network domains 130, 140, and 150 illustrate a similar configuration.

It should be noted, however, that the configuration of the network domains 120, 130, 140, and 150 as well as the configuration of the network elements 120a-120d, 130a-130d, 140a-140d, and 150a-150d within each of the network domains 120, 130, 140, and 150, respectively, are provided for illustrative purposes only. As one of ordinary skill in the art will appreciate, the network domains 120, 130, 140, and 150 as well as the configuration of the network elements 120a-120d, 130a-130d, 140a-140d, and 150a-150d may have any configuration, including different configurations with each of the network domains 120, 130, 140, and 150. Furthermore, the number of and the interconnections of the network elements 120a-120d, 130a-130d, 140a-140d, and 150a-150d may vary between network domains.

As indicated by the inter-domain links 160-162, the network domains 120, 130, 140, and 150 are communicatively coupled to one or more other network domains. For illustrative purposes, the network domain 120 is illustrated as being communicatively coupled to the network domain 130, the network domain 130 is illustrated as being communicatively coupled to the network domains 120 and 140, the network domain 140 is illustrated as being communicatively coupled to the network domains 130 and 150, and the network domain 150 is illustrated as being communicatively coupled to the network domain 140. Each of the network domains 120, 130, 140, and 150, however, may have other connections. For example, the network domain 140 may also be communicatively coupled to the network domain 120.

The inter-domain links 160-162 are illustrated as a single link interconnecting network domains for illustrative purposes only. In an embodiment, the inter-domain links 160-162 comprise a plurality of links to provide a greater capacity and redundancy. In this manner, if a link fails, then communication may still occur between the affected network domains. It should also be noted that the inter-domain links 160-162 are coupled to one or more of the network elements 120a-120d, 130a-130d, 140a-140d, and 150a-150d. The inter-domain links 160-162 are illustrated as terminating at the network domains 120, 130, 140, and 150 for illustrative purposes only and to simplify the network diagram 100.

The network diagram 100 also includes session signaling devices 170 and 171. In an embodiment, the session signaling devices 170 and 171 comprise softswitches using, for example, the SIP or H.323 signaling protocols that provide call control functions for call setup and teardown. In other embodiments, the session signaling devices 170 and 171 may include application servers, session border controllers, security gateways, and/or the like.

Additionally, the network 100 also includes one or more resource control points (RCP), such as RCPs 180-183. In an embodiment, each network domain 120, 130, 140, and 150 is equipped with an RCP, such as RCP 180, 181, 182, and 183, respectively, as illustrated in FIG. 1. The RCPs 180-183 are communicatively coupled to the network elements within each of the respective network domains. The RCPs 180-183 are further communicatively coupled to one or more other RCPs. For example, RCP 181 is communicatively coupled to the network elements within the network domain 130 (e.g., network elements 130a-130d) and to the RCPs 180 and 182.

As illustrated in FIG. 1, at least some of the RCPs within the network 100 are communicatively coupled to the session signaling devices. In the embodiment illustrated in FIG. 1, RCP 180 is communicatively coupled to the session signaling device 170 and RCP 183 is communicatively coupled to the session signaling device 171. In an embodiment, RCPs are communicatively coupled to session signaling device via a direct logical link. In this embodiment, the session signaling device communicates directly with the RCPs by transmitting a message directed to the RCP. In another embodiment, the RCPs passively monitor the call signaling communications between the respective session signaling device and other network elements.

Figure 2:
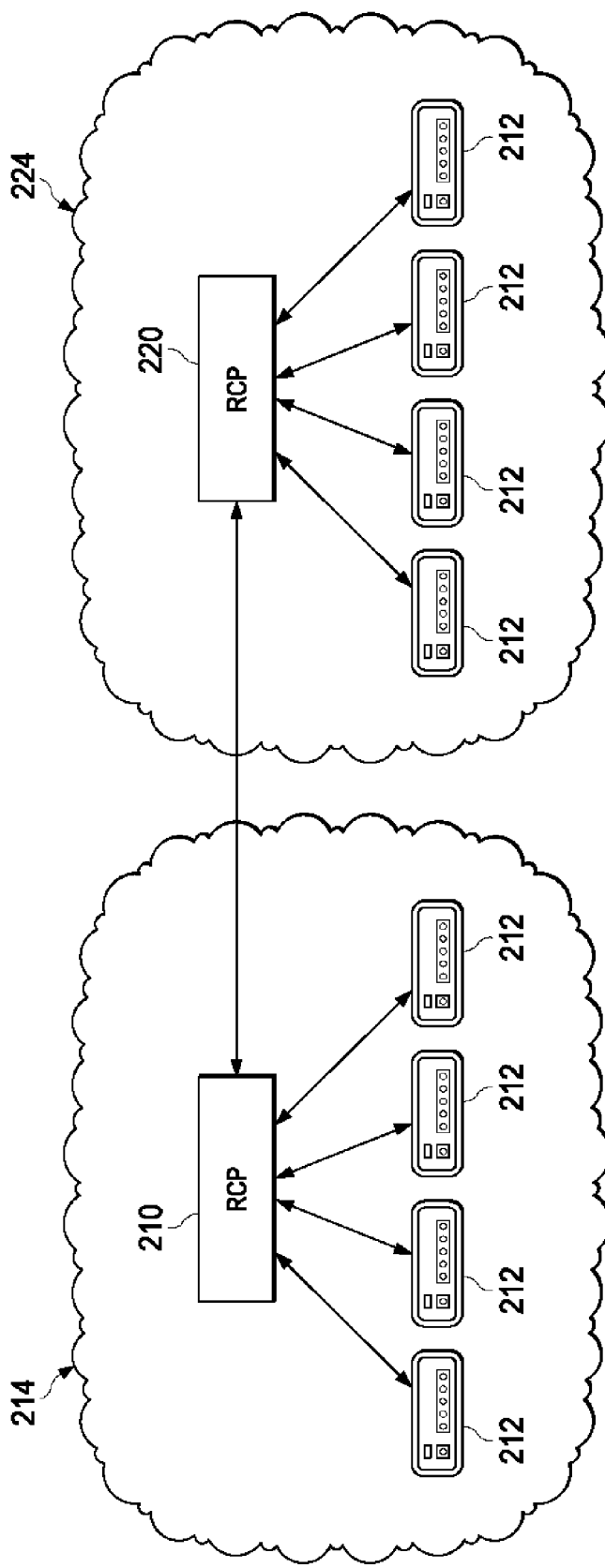
FIG. 2 is a network diagram embodying features of an embodiment of the present invention.

FIG. 2 illustrates the communication between an RCP 210 and network elements 212 within a network domain 214 in accordance with an embodiment of the present invention. The RCP 210 may represent any of the RCPs 180-183, the network elements 212 may represent the respective network elements 120a-120d, 130a-130d, 140a-140d, and 150a-150d, and the network domain 214 may represent the respective network domains 120, 130, 140, and 150 of FIG. 1.

In a preferred embodiment, the RCP 210 speaks IP routing protocols, such as OSPF, ISIS and/or BGP, to the other devices in the network such that the RCP 210 appears to those other devices to be another router or network element to the network elements 212. In this manner, the RCP 210 is provided the routing table information associated with each of the network elements 212. The routing table information provided can be learned directly via communications from a particular network element 212 or indirectly through communications with one or more of the network elements 212. By the RCP 210 communicating with the network elements 212, the network elements 212 communicate with the RCP 210 to provide routing and information to the RCP 210. This allows the RCP 210 to initially derive the route information associated with each network element in 212 and to dynamically maintain the route information. The route information may include, for example, information pertaining to which network elements are present, how the network elements are interconnected for routing purposes, what path packets destined from a particular device to another device in the network will take, and the like.

In an embodiment, the communications between the RCP 210 and the network elements 212 may be performed using different protocols. Generally, the network elements 212, such as routers, support various types of protocols, wherein each protocol may provide different information not available when using other protocols. For example, in a preferred embodiment the RCP 210 communicates with the network elements 212 using the Open Shortest Path First (OSPF) protocol and the Border Gateway Protocol (BGP). Using the OSPF protocol allows the RCP 210 to retrieve information to calculate the OSPF portion of the routing table of the network elements 212. In an embodiment, each of the OSPF-speaking network elements 212 within the network domain 214 has all of the routing information necessary to calculate the routing table information for any particular network element 212 associated with the OSPF protocol assuming that all network elements 212 are part of the same OSPF area. Accordingly, it may only be necessary for the RCP 210 to communicate with only the network elements 212 which contain unique OSPF area routing information to retrieve all of the routing information between network elements 212 within the network domain 214. The information on the RCP 210 obtained from the network elements 212 via, for example, OSPF, preferably includes a series of Link State Advertisements (LSAs). On an OSPF-enabled network element, such as network element 212, OSPF uses a database of LSAs to determine the interconnections between the network elements 212 plus any other devices within the OSPF area. The OSPF-enabled network element 212 may perform a routing algorithm, such as a Dijkstra or Shortest Path First algorithm, on that LSA data starting with itself as a "root" of the calculation to determine its OSPF routes. By using the information obtained by the RCP 210 using OSPF or some other protocol, the RCP 210 determines the routes of any particular network element 212 by applying, for example, a Dijkstra or Shortest Path First algorithm to the LSA database obtained by the RCP 210 via OSPF, or other protocol, with the particular network element 212 that acts as the "root" of the Dijkstra or Shortest Path First algorithm. The result is that the RCP 210 can calculate the OSPF protocol portion of the route table associated with any particular network element 212.

Using the BGP routing protocol allows the RCP 210 to retrieve the routing information associated with the BGP protocol which includes inter-network domain (such as between network domain 210 and a network domain 224, routing information potentially having the scope of the entire Internet. While the RCP 210 may retrieve part of the necessary routing information using the OSPF protocol by communicating with a single network element, it is preferred that the RCP 210 communicate to each of the network elements 212 using BGP to determine all of the routing information between network domains if BGP is enabled within the routing domain. In the case of BGP, the RCP 210 establishes Internal BGP peering relationships with each BGP-speaking router among the network elements 212. These peering relationships are IBGP (Internal BGP) sessions. On each session established between RCP 210 and the BGP-speaking network elements 212, the route reflection client option within BGP is enabled. The combination of making the BGP peering relationship IBGP and enabling the route reflection client option on the peering relationship will result in each of the BGP-speaking network elements 212 sending their entire BGP portion of their routing table to the RCP 210. In this manner, the RCP 210 gains all of the BGP routing information for all of the individual BGP-speaking elements 212.

Additionally, it is preferred that the RCP 210 retrieve additional information regarding the routing information and the network. The OSPF and BGP protocols generally provide routing information regarding the network elements 212 but are limited to routing information shared between and among the network elements 212. The network elements 212, however, also contain information regarding the network elements 212 and the links there between which is not shared among the network elements 212 through routing protocols. This information may be retrieved by the RCP 210 utilizing another communications method to request the specific information.

For example, a request may be initiated by the RCP 210 using Simplified Network Management Protocol (SNMP), a command line interface (CLI), an extended markup language (XML), or the like to obtain additional information from one or more of the network elements 212. The additional information may include, for example, static routing information, Multi-Label Protocol Label Switching (MPLS) tunnel characteristics, link names, network element names, status information, capacity information, secondary IP addresses, routing distance policy, route redistribution policy, and the like. In the case of static routing information, which is provisioned routing information unique to a network element 212 and not shared via a routing protocol between network elements, the static routes of a particular network element 212 may be acquired via the methods previously discussed.

One of ordinary skill in the art will appreciate that by adding the RCP 210 to the routing tables of the network elements 212 within the respective network domain 214, the RCP 210 will be automatically updated with respect to any changes within the network domain. For example, upon power-up the network elements 212 will communicate using the OSPF protocol the routing information within the network domain 214 to the RCP 210. The RCP 210 may communicate with each of the network elements 210 within the respective network domain 214 using the BGP to determine the routing information between network domains and/or business networks/entities. Thereafter, if a link or a network element fails or the status changes, the RCP 210 is notified because the RCP 210 is contained within the routing tables of the individual network elements 212. The RCP 210 may further communicate with each of the network elements 212 within the respective network domain 214 using, for example, the SNMP/CLI/XML to determine other routing information not available using the other protocols.

It should be noted that the protocols and the procedures discussed above were provided for purposes of illustration only. One of ordinary skill in the art will realize that other routing protocols and procedures may be used. For example, protocols such as Intermediate System-Intermediate System (ISIS), Routing Information Protocol (RIP), Interior Gateway Routing Protocol (IGRP), Enhanced IGRP (EIGRP), or the like may also be used.

FIG. 2 also illustrates the communications between RCPs, such as the RCP 210 and a RCP 220, in accordance with an embodiment of the present invention. In an embodiment, a set of extensions to the Common Open Policy Service (COPS) protocol known as COPS-RM is used. At system startup, the RCPs 210 and 220 communicate via COPS-RM to notify each other of the network interfaces that comprise the edges of their domain. For example, the RCP 210 will notify the RCP 220 of all the network links that connect the network elements 212 within the domain of RCP 210 with the network elements 212 within the domain of RCP 220. When links connecting the domains are added or removed, the RCPs 210 and 220 communicate with each other to notify each other of the changes through COPS-RM. In normal system operation, sessions on paths that span domains are signaled from one RCP domain to the next via COPS-RM.

Figure 3:
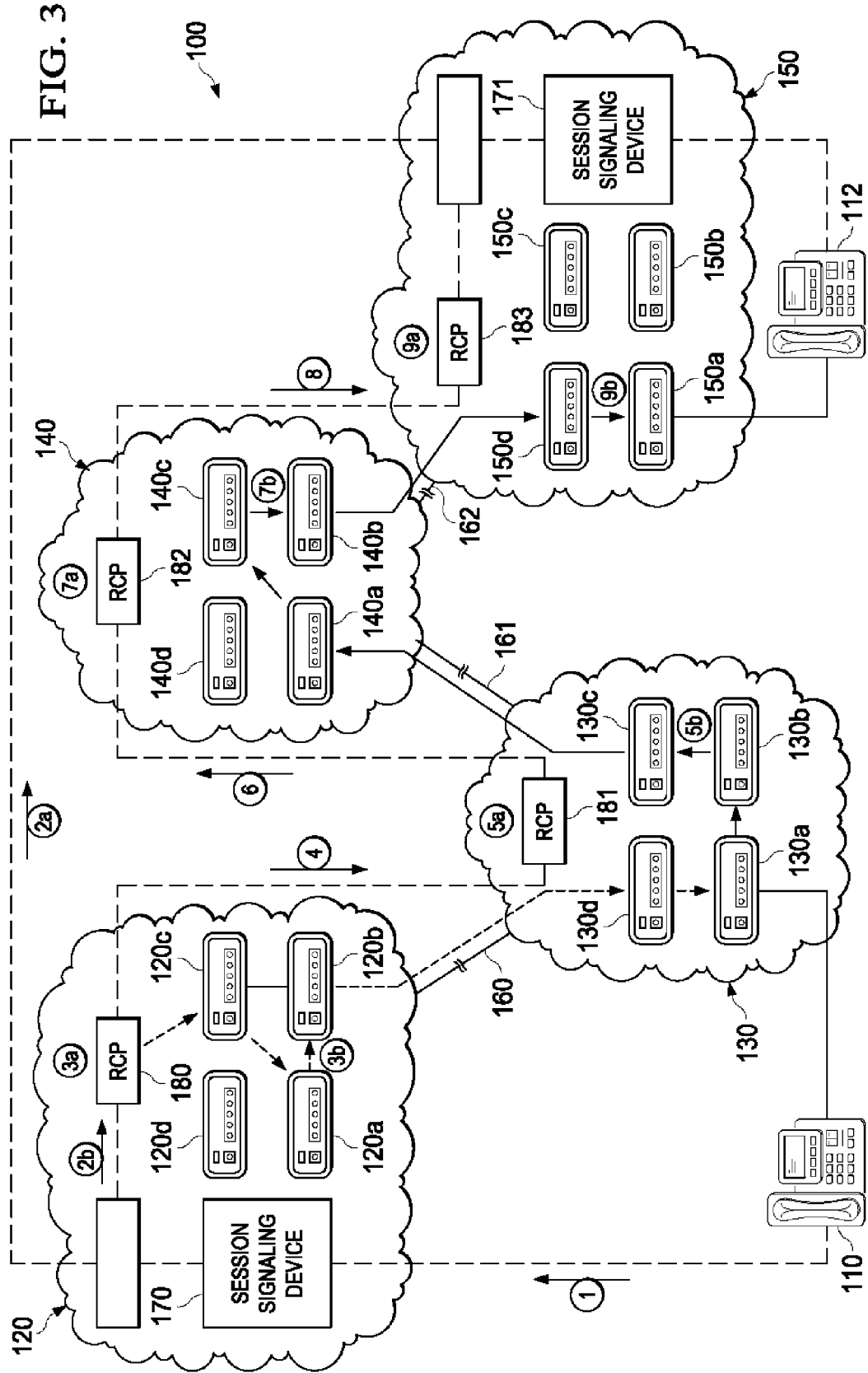
FIG. 3 is a network diagram illustrating an operation of an embodiment of the present invention.

FIG. 3 provides an overview of an operation of an embodiment of the present invention. For purposes of illustration, the operation is described in terms of the network 100 discussed above with reference to FIG. 1, where like reference numerals refer to like elements. It should be noted, however, that not all of the interconnections between the various elements are illustrated in FIG. 3, thereby allowing the communications between the various network elements during call setup to be better illustrated.

Initially, indicated by a reference numeral 1, a call is initiated by the originating customer device 110 transmitting to the session signaling device 170 a call request. The session signaling device 170 receives the call request and forwards the request to the session signaling device 171 that is servicing the terminating customer device 112, as indicated by reference numeral 2a. The call request is further transmitted to the RCP 180 as indicated by reference numeral 2b. As noted above, the call request may be transmitted to the RCP 180 by either a message addressed and sent directly to the RCP 180 or the RCP 180 may passively monitor the communications link for relevant messages.

The call request includes, among other things, the source and destination IP addresses of the originating and terminating communication devices 110 and 112, respectively. In this embodiment, the call request includes the IP address of the originating customer communication device 110 as the source IP address and the IP address of the terminating communication device 112 as the destination IP address.

Upon receipt of the call request, the RCP 180 determines the network element servicing the originating communication device 110. The determination of the network element servicing the originating communications device 110 is determined by first causing the RCP 180 to examine the routing information contained in the RCP 180 that was retrieved from the network elements 120a-120d within the network domain 120 as discussed above as indicated by reference numeral 3a. By examining the routing information, the RCP 180 determines by examining the routing information of the network elements within the domain using the IP source address to track back through the network to the originating communications device 110. In this manner, the last network element, which is the network element where packet traffic from the originating communication device 110 enters the network, may be determined.

It should be noted that the tracking used to find the originating communications device 110 from the RCP 180 may be a hypothetical or virtual message in that no traffic is actually sent over the network elements from the RCP 180 to the originating communications device 110. Rather, the RCP 180 preferably examines the routing information retrieved from network elements contained within its network domain to determine the path traffic would be routed if a message were to be actually sent. In this case, the path is illustrated by the dotted line from the RCP 180 to the network elements 120c, 120a, and 120b, sequentially, as illustrated by reference numeral 3b.

At this point, the RCP 180 has determined that the network element servicing the source communication device 110 is not contained within the network domain 120 and that the call request should be transmitted to the network element 130d contained within the network domain 130. Accordingly, as indicated by reference numeral 4, the RCP 180 transmits a call request to the RCP 181, which services the network domain 130. The call request includes, among other things, the ingress point as the network element 130d and the destination IP address, which at this point remains the IP address of the originating communications device 110.

The RCP 181 receives the call request and determines a route a message sent to the originating communications device 110 would take by examining the routing information obtained by the RCP 181 from the network elements 130a-130d as discussed above. This process is illustrated by reference numeral 5a. In this case, the network element 130a is determined as the network element servicing the originating communications device 110.

The RCP 181 then determines the route that will be taken by message traffic from the network element 130*a* (and the originating communications device 110) to the terminating communications device 112. This process includes the RCP 181 examining the routing information retrieved from the network elements 130*a*-130*d* to obtain a route through the network domain 130 as indicated by reference numeral 5*b*. In this case, the route through the network domain 130 runs from network element 130*a* to network element 130*b* to network element 130*c*.

The RCP 181 transmits a call request to the RCP 182 providing the RCP 182 with, among other things, the ingress point as the network element 140*a* and the IP address of the terminating communications device 112 as the destination IP address. As indicated by reference numeral 7*a*, the RCP 182 examines the routing information the RCP 182 retrieved from the network elements 140*a*-140*d* to determine the route taken by traffic sent from the originating communications device 110 to the terminating communications device 112. In this case, the route comprises communication links from the network element 140*a* to the network element 140*c* to the network element 140*b*, at which point the user traffic exits the network domain 140, as illustrated by reference numeral 7*b*.

The RCP 182 transmits a call request to the RCP 183, providing the RCP 183 with, among other things, the ingress point as the network element 150*d* and the IP address of the terminating communications device 112 as the destination IP address. As indicated by reference numeral 9*a*, the RCP 183 examines the routing information the RCP 183 retrieved from the network elements 150*a*-150*d* to determine the route to be taken through the network domain 150 by traffic sent from the originating communications device 110 to the terminating communications device 112. In this case, the route comprises communication links from the network element 150*d* to the network element 150*a*, which is the network element servicing the destination customer device 112, as illustrated by reference numeral 9*b*.

As one of ordinary skill in the art will appreciate, the process described above allows the RCPs 180-183 to determine the collection of individual communication links and network elements to be used throughout the various network domains 120, 130, 140, and 150. Furthermore, because the RCPs 180-183 are included in the routing tables of the respective network elements 120*a*-120*d*, 130*a*-130*d*, 140*a*-140*d*, and 150*a*-150*d*, the RCPs 180-183 will be informed of any changes to the route, including when a communications link fails or is busy causing traffic to be routed differently.

It should be noted, however, that FIG. 3 illustrates the traffic routed from the originating communications device 110 to the terminating communications device 112. Because traffic is frequently bi-directional and that the route taken by traffic from the originating communications device 110 to the terminating communications device 112 may be different than the route taken by traffic from the terminating communications device 112 to the originating communications device 110, it may be desirable to duplicate the process for traffic from the terminating communications device 112 to the originating communications device 110 to determine the routes taken by traffic in both directions.

Figure 4:
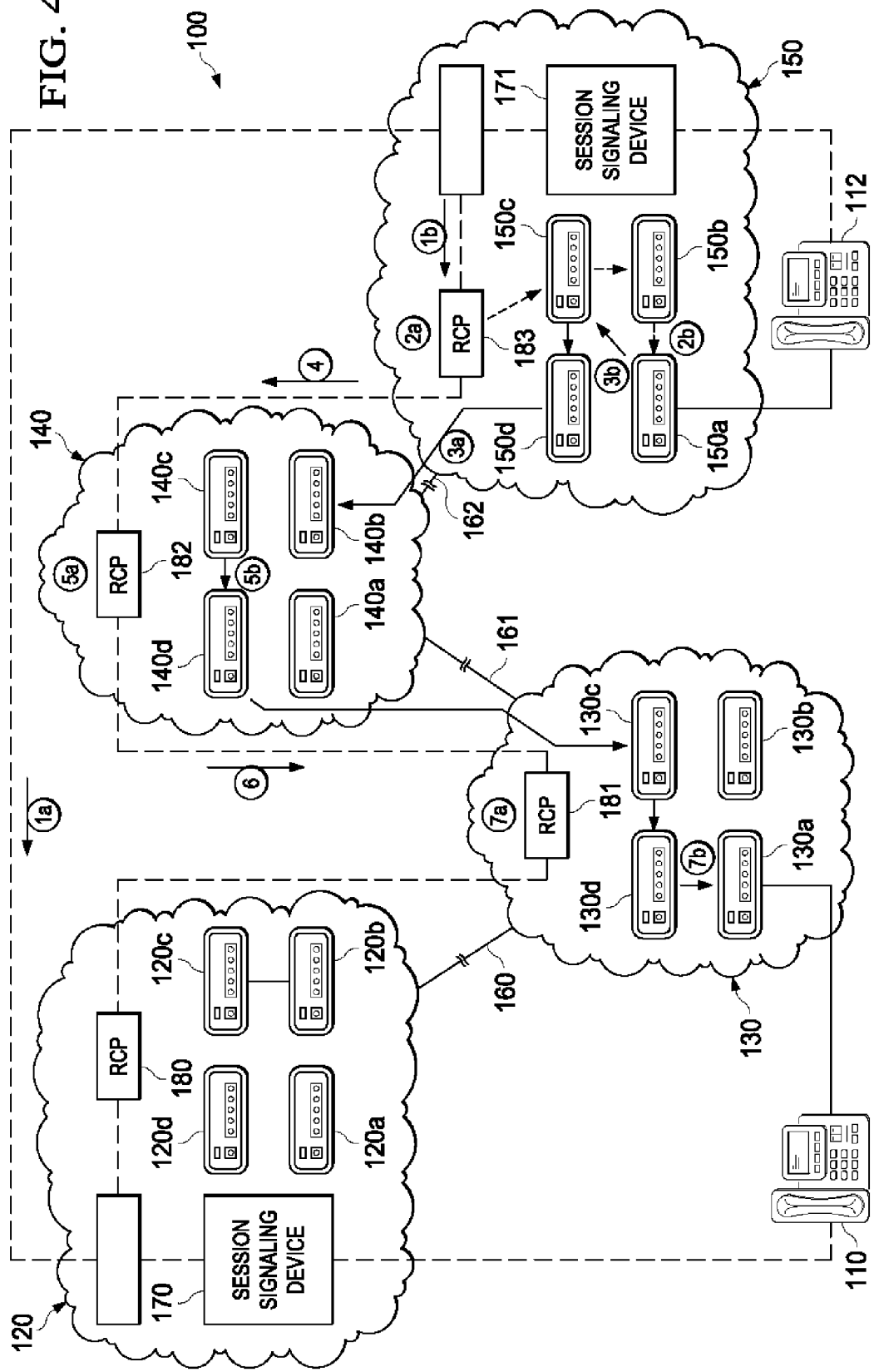
FIG. 4 is a network diagram illustrating an operation of an embodiment of the present invention.

FIG. 4 illustrates an overview of an operation of an embodiment of the present invention in which a route for traffic from the terminating communications device 112 to the originating communications device 110 is determined. As indicated by reference numeral 1*a*, the session signaling device 171 transmits a call request to the session signaling device 170 to initiate a return route for the bidirectional communications request. The RCP 183 receives by either a direct communication of or passively intercepting the call request as illustrated by reference numeral 1*b*. The RCP 183 determines the network element that is servicing the terminating communications device 112 as indicated by reference numerals 2*a* and 2*b*. In this case, the network element servicing the terminating communications device 112 is the network element 150*a* contained within the current network domain 150, and therefore, the RCP 183 does not need to transmit a request to another RCP to determine the network element servicing the terminating communications device 112.

Thereafter, the RCP 183 determines a route from the terminating communications device 112 to the originating communications device 110 through the network domain 150 as indicated by reference numerals 3*a* and 3*b*. Because the originating communications device 110 is not within the network domain 150, the RCP 183 transmits a call request to the RCP 182 as indicated by reference numeral 4. The RCP 182 determines the route through the network domain 140 as indicated by the reference numerals 5*a* and 5*b* and transmits a call request message to the RCP 181 as indicated by reference numeral 6. The RCP 181 receives the call request and determines the route through the network domain 130. At this point the RCP 181 determines that the call may be routed to the network element that is servicing the originating communications device 110, and therefore, the RCP 181 does not need to forward the call request to another RCP.

Accordingly, following the processes described above, the RCPs 180-183 have determined the routes that call traffic for a bi-directional communications will take in each direction, thereby allowing the RCPs 180-183 to monitor the status of each link of the communications path taken throughout the communications network. It should be noted that the processes described above with reference to FIGS. 3 and 4 may be performed sequentially or in parallel.

FIG. 5 is a network environment illustrating an embodiment of the present invention in which one of the communications devices 110 and 112 is not connected directly to the same data network as the other. In the embodiment illustrated in FIG. 5, the terminating communications device 112 is connected to the Public Switched Telephone Network (PSTN) 510. In this type of situation, the PSTN 510 interfaces with the network elements, e.g., network element 150*a*, via a border gateway route (not shown) as is known in the art. In an embodiment, the RCPs 180-183 may not have routing information regarding the routing of the call within the PSTN 510, but rather will monitor the communications link throughout the data network 100 (see FIG. 1). As will be described in greater detail below, the call detail records (CDRs) that are generally kept within the PSTN 510 may be correlated with the routing information kept by the RCPs in accordance with embodiments of the present invention.

Figure 6:
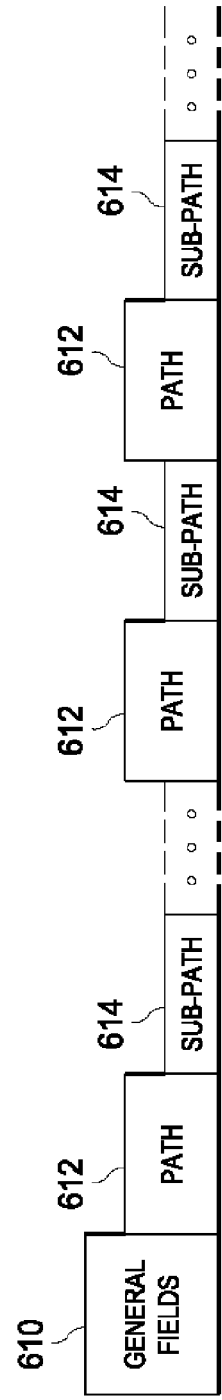
FIG. 6 is a quality service record in accordance with an embodiment of the present invention.

FIG. 6 illustrates a quality service record (QSR) that may be generated in accordance with an embodiment of the present invention. In an embodiment, a QSR record such as that illustrated in FIG. 6 is maintained by each RCP within a network domain servicing the corresponding call or session. In another embodiment, the QSR is maintained at a single location, such as a designated RCP or a central repository.

In an embodiment, the QSR includes a general fields section 610 and one or more path fields sections 612. Each path fields section 612 comprises one or more sub-path fields section 614. Tables I, II, and III recite examples of information that may be included in each of the general fields section 610, path fields section 612, and sub-path fields section 614, respectively, of a QSR in an embodiment. It should be noted that the arrangement illustrated in FIG. 6 is provided for illustrative purposes only and that other arrangements may be used. It should also be noted that each path fields section 612 may include more or less sub-path fields sections 614, and the general fields section 610 may have more or less path fields section 612 and/or sub-path fields sections 614 as illustrated by the ellipses in FIG. 6. A sub-path represents the piece of a total path that can be calculated by a single RCP. The path is the end-to-end path composed of the sub-paths calculated by the individual RCPs.

TABLE I

General Fields Section

| Field Name | Field Size | Field Description |
|---|---|---|
| Message type | 1 byte | This field indicates the message type for session query response (3). |
| Version | 1 byte | This field is a version number. |
| Message Length | 2 bytes | This field indicates the overall length in bytes of the Message including Message type and Version fields. |
| Request ID | 4 bytes | This field is copied from the associated request into every response record. It allows the receiver to determine to which request a particular response is associated. |
| Last Response | 1 bit | If this field is set, this is the last response record for the query identified by Request ID. |
| Session ID | 4 bytes | Identifier to distinguish specific session. |
| service type | 2 bytes | This field indicates the type of service being signaled. The initial defined types are 1 - VOIP and 2 - Video. |
| source IP Address | 4 bytes | This field indicates the IPv4 Source Address of the media session associated with the service. |
| destination IP Address | 4 bytes | This field indicates the IPv4 Destination Address of the media session associated with the service. |
| source IP port | 2 bytes | This field indicates the IPv4 Source Port of the media session associated with the service. If the port is unknown or inapplicable, the field is set to zero. |
| destination IP port | 2 bytes | This field indicates the IPv4 Destination Port of the media session associated with the service. If the port is unknown or inapplicable, the field is set to zero. |
| session start time | 8 bytes | This field indicates a UTC timestamp indicating the start of the session. |
| DSCP (DiffServ code point) | 1 byte | This field indicates, if known, the DiffServ code point associated with the service session. If the DSCP is not known, the field is set to "0." |
| Bandwidth | 4 bytes | This field indicates the bandwidth associated with the session in kilobytes per second. |
| Signaling protocol type | 1 byte | The signaling protocol associated with the session. 0 - Unknown, 1 - SIP, 2 - COPS, 3 - DIAMETER, 4 - H.323, 5 - HTTP, 6 IKE (IPSEC) |
| Session ID length | 1 byte | The length of the Session ID string field that follows. If this is zero, there is no Session ID field. This is assumed to be used for SIP call IDs. |
| Session ID | <Session ID length> bytes | This is an ASCII string made of 8-bit characters that represents the Session ID. |
| session duration | 4 bytes | This field indicates the duration of the session in msec relative to the session start time. |
| bandwidth exceeded event count | 1 byte | This field indicates a count of how many times a bandwidth exceeded event occurred along the path the session was using. |
| routing loop detected event count | 1 byte | This field indicates a count of how many times a routing loop occurred on the path the session was using. |
| routing unstable event count | 1 byte | This field indicates a count of how many times a routing unstable event occurred along the path the session was using. |
| link down event count | 1 byte | This field indicates a count of how many times a link down event occurred along the path the session was using. |
| route unreachable event count | 1 byte | This field indicates a count of how many times an unreachable route event occurred along the path the session was using. |
| Total Path Count | | This field indicates the total number of paths calculated for the session. |

TABLE II

Path Section

| Field Name | Field Size | Field Description |
|---|---|---|
| Path Start Time | 8 bytes | UTC timestamp indicating when the session started using this particular path. |

TABLE II-continued

Path Section

| Field Name | Field Size | Field Description |
|---|---|---|
| Path Duration | 4 bytes | Duration (msec) of the time the session used this particular path. |
| Path Length | 2 bytes | The number of total bytes in this "path" portion of the QSR. (the sum of the bytes in the sub paths plus bytes in start time, duration and length). |

TABLE III

Sub-Path Section

| Field Name | Field Size | Field Description |
|---|---|---|
| RCP Address | 4 bytes | The IP address of the RCP that calculated this sub path. |
| Sub path Length | 2 bytes | Length (bytes) of the sub path portion of the message (RCP address, sub path address, router ID/Router Address pairs). |
| Router Address | 4 bytes | IP address used to identify the first router on the path through the RCP domain. |
| Interface ID | 2 bytes | Interface identifier (IFINDEX) of the egress interface of the router (previous router-address field) along the path. |
| Router Address | 4 bytes | IP address used to identify the second router on the path through the RCP domain. |
| Interface ID | 2 bytes | Interface identifier (IFINDEX) of the egress interface of the router (previous router-address field) along the path. |
| Router Address | 4 bytes | IP address used to identify the third router on the path through the RCP domain. |
| Interface ID | 2 bytes | Interface identifier (IFINDEX) of the egress interface of the router (previous router-address field) along the path. |

Figure 7:
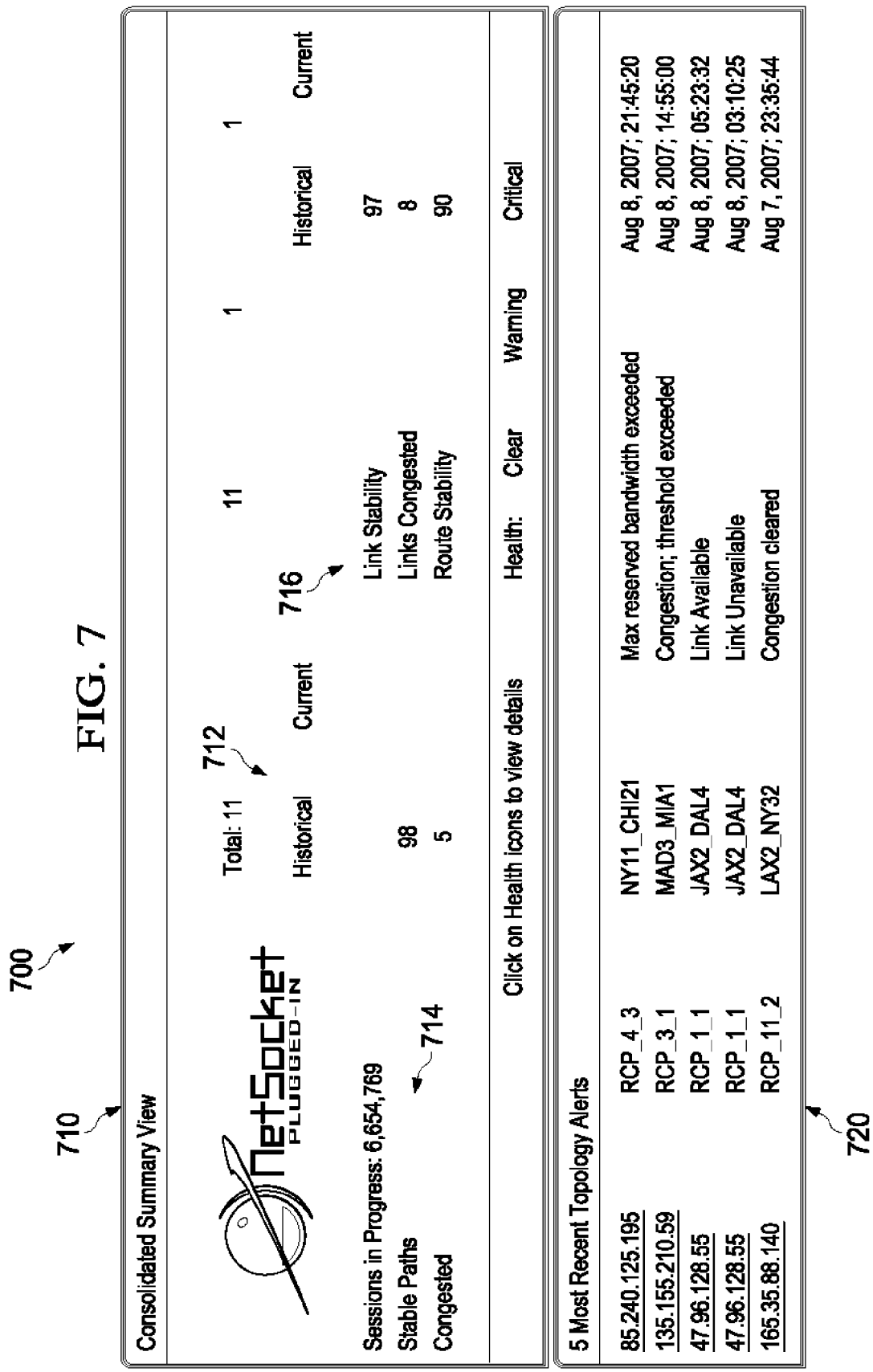
FIG. 7 is a display that may be used in accordance with an embodiment of the present invention.

FIG. 7 illustrates a display 700 that may be generated using the information maintained in the QSRs discussed above in accordance with an embodiment of the present invention. The display may be created by retrieving and combining the various QSR records maintained by the various RCPs within the data network to provide reports regarding resource management for services within the data network, the path used by the session across the data network, fault information for the session in the context of the network topology and congestion information as concerns the resources in the data network used by the session. It should be noted, however, that the display 700 provided in FIG. 7 is provided for illustrative purposes only and that other displays, additional information, less information, and the like may be provided in other embodiments.

In this embodiment, the display 700 is divided into two sections: a "Consolidated Summary View" section 710 and a "5 Most Recent Topology Alerts" section 720. The "Consolidated Summary View" section 710 provides an RCP Status section 712, a Session status section 714, and a Topology status section 716. The RCP Status section 712 provides an indication of the number of active RCPs and an indication of the health of the RCPs. In an embodiment, the health of the RCPs is set as the lowest (critical being the lowest) status of all of the RCPs. Accordingly, as illustrated in FIG. 7, the network currently has 11 RCPs in service, of which one RCP is in critical condition and one RCP has a minor warning.

The Sessions status section 714 provides information regarding the individual sessions currently instantiated within the network. In the embodiment illustrated in FIG. 7, the number of sessions currently in progress is provided as well as the percentage and health of the stable paths and the congested paths.

The Topology status section 716 provides information regarding the individual links between network elements. For example, the embodiment illustrated in FIG. 7 provides information regarding the link stability, link congestion, and route stability.

The "5 Most Recent Topology Alerts" section 720 provides a listing of the previous alerts and the current status. For example, in the embodiment illustrated in FIG. 7, the RCP address and identifier of the RCP reporting the problem is identified as well as the particular link identifier in the corresponding network domain exhibiting the problem is provided. A message provides an indication of the type of problem and the time the problem was reported is provided.

Figure 8:
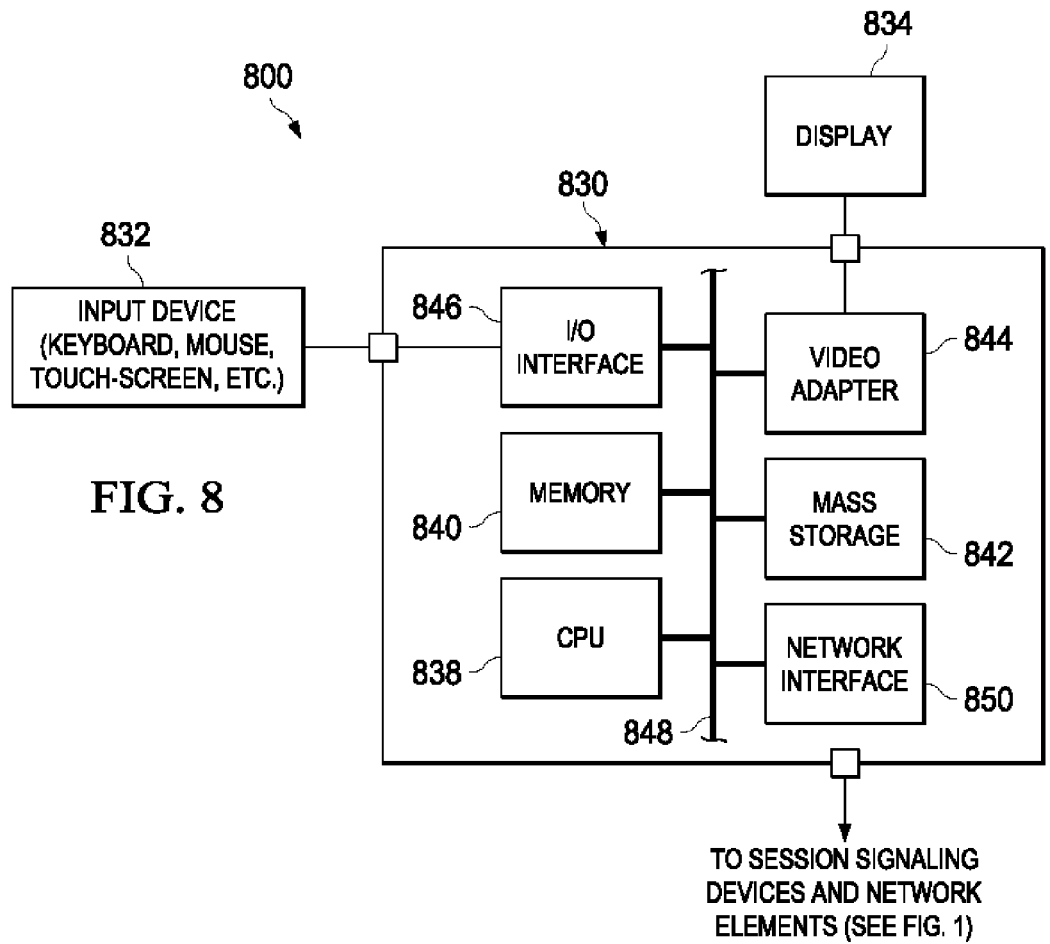
FIG. 8 is a block diagram of a resource control point in accordance with an embodiment of the present invention.

FIG. 8 is a block diagram of an RCP 800, such as RCPs 180-183, in accordance with an embodiment of the present invention. Generally, the RCP 800 may comprise a processing unit 830 optionally equipped with one or more local input devices 832 (e.g., a mouse, a keyboard, or the like) and one or more output devices (e.g., a display 834 or the like). The processing unit 830 may be, for example, a desktop computer, a workstation, a laptop computer, a dedicated unit customized for a particular application, or the like. The processing unit 830 and the display 834 may be integrated into a single unit such as a laptop computer.

Generally, the processing unit 830 includes a central processing unit (CPU) 838, memory 840, a mass storage device 842, a video adapter 844, and an I/O interface 846 connected to a bus 848. The bus 848 may be one or more of any type of several bus architectures including a memory bus or memory controller, a peripheral bus, video bus, or the like. The CPU 838 may comprise any type of electronic data processor, such as a general purpose processor, a Reduced Instruction Set Computer (RISC), a Complex Instruction Set Computer (CISC), Application-Specific Integrated Circuit (ASIC), or the like. The memory 840 may comprise any type of system memory such as static random access memory (SRAM), dynamic random access memory (DRAM), synchronous DRAM (SDRAM), read-only memory (ROM), double data rate random access memory (DDR RAM), a combination thereof, or the like. In an embodiment, the memory 840 may include ROM for use at boot-up, and DRAM for data storage for use while executing programs.

The mass storage device 842 may comprise any type of storage device configured to store data, programs, and other information and to make the data, programs, and other information accessible via the bus 848. In a preferred embodiment, the mass storage device 842 is configured to store the computer software programs to be executed by the CPU 838. The mass storage device 842 may comprise, for example, one or more of a hard disk drive, a magnetic disk drive, an optical disk drive, solid state memories (e.g., flash and universal serial bus (USB) memory keys), or the like.

The video adapter 844 and the I/O interface 846 provide interfaces to couple external input and output devices to the processing unit 830. As illustrated in FIG. 8, examples of input and output devices include the display 834 coupled to the video adapter 844 and the input device 832 coupled to the I/O interface 846.

The processing unit 830 may also include a network interface 850. The network interface 850 allows the processing unit 830 to communicate with remote units via a network (not shown). In an embodiment, the processing unit 830 is coupled to a local-area network or a wide-area network to provide communications to other devices, particularly session signaling devices (e.g., session signaling devices 170 and 171), network elements (e.g., network elements 120a-120d, 130a-130d, 140a-140d and 150a-150d), other RCPs (e.g., RCPs 180-183), an like. The network interface 850 may also provide a network connection to remotely access the RCP 800 for monitoring the status, performing maintenance, updating software, and the like. The network interface 850 may provide an interface for a wired link, such as an Ethernet cable or the like, and/or a wireless link. It should also be noted that a single connection is provided solely for illustrative purposes. Accordingly, the RCP 800 may have a one or more physical connections and each physical connection may have one or more logical connections to other network components.

It should be noted that the RCP 800 can include other components not shown in FIG. 8. For example, the RCP 800 can include power supplies, cables, a motherboard, removable storage media, cases, and the like.

Figure 9:
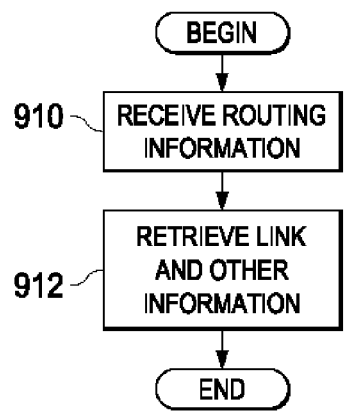
FIG. 9 is a flow diagram depicting steps that may be performed to obtain routing and link information in accordance with an embodiment of the present invention.

FIG. 9 is a flow chart illustrating a process that an RCP, such as RCPs 180-183, may perform to initialize and maintain routing and link information for network elements with which the RCP communicates in accordance with an embodiment of the present invention. The process begins in step 910, wherein the RCP receives routing information from the network elements with which the RCP communicates. As discussed above, the RCP is preferably added to the routing tables of the network elements within the network domain. In this manner, the network elements communicate the routing information automatically to the RCP as if the RCP were another network element.

In step 912, the RCP retrieves from the network elements within the network domain additional link and other information not automatically provided by the network elements in step 910, such as Virtual Local Area Network (VLAN) tags on interfaces, unnumbered address status of interfaces, MPLS Traffic Engineering parameters (including MPLS tunnel endpoint information, traffic engineering routing configuration, hop information, and the like), IP Static Routes, MPLS Tunnel ingress and egress information and connected routes associated with the remote side of point to point links. This process may involve directly accessing each of the network elements by the RCP as discussed above.

One of ordinary skill in the art will appreciate that the above-described process may be performed, for example, on power-up, periodically, as new elements are brought on-line, as changes are made to the network architecture, and/or the like.

Figure 10:
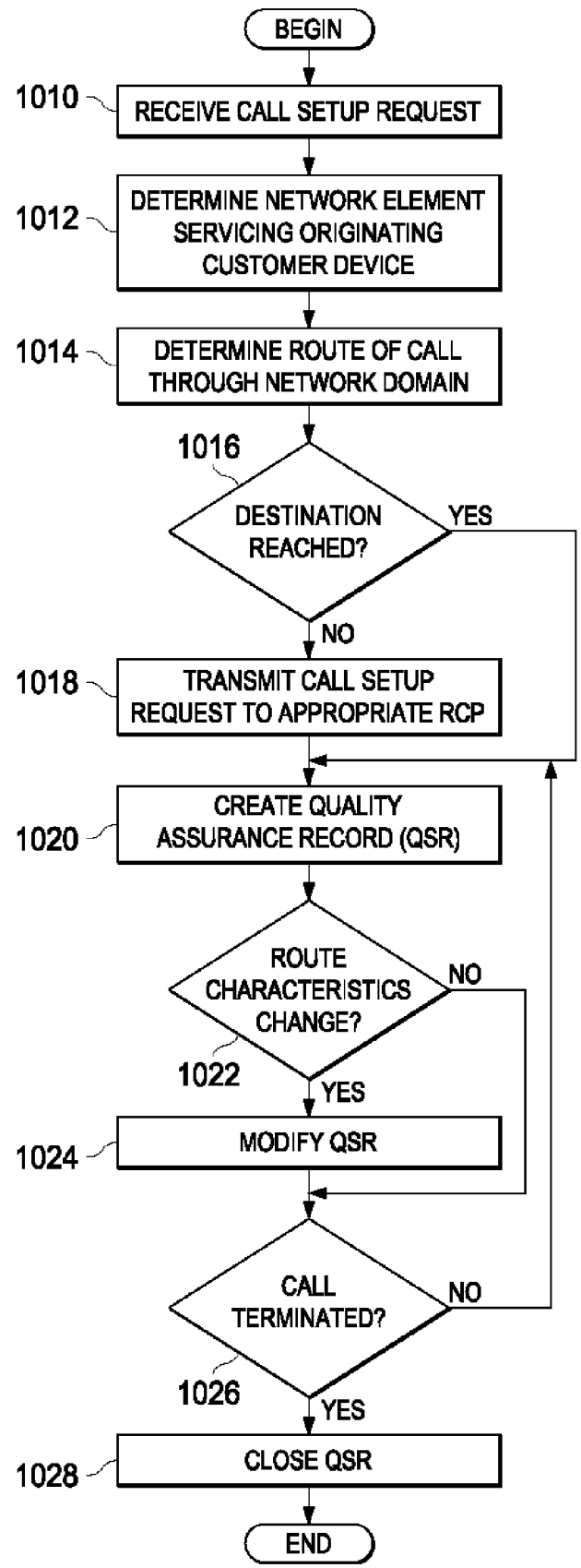
FIG. 10 is a flow diagram depicting steps that may be performed to build a quality service record in accordance with an embodiment of the present invention.

FIG. 10 is a flow chart illustrating a process that an RCP, such as RCPs 180-183, may perform to create a quality service record (QSR) in accordance with an embodiment of the present invention. The process begins in step 1010, wherein a call request message is received. The call request message may be received, for example, from a session signaling device or another RCP. Upon receipt of the call request message, in step 1012 the network element servicing the originating communications device is determined. If the network element servicing the originating communications device is serviced by the current RCP, then the network element servicing the originating communications device may be determined. If, on the other hand, the network element servicing the originating communications device is serviced by another RCP, then this process preferably includes transmitting a call setup request to the appropriate RCP in accordance with the routing tables maintained within the current RCP.

Next, in step 1014, a route to be taken through the network domain of the respective RCP is determined. As noted above, this determination is preferably made internal to the RCP by examining the routing and link information the RCP obtained from the individual network elements and without requesting additional information dynamically from the individual network elements.

In step 1016, a determination is made whether or not the destination or the network element servicing the terminating communications device has been reached. If a determination is made that the network element servicing the terminating communications device has not been determined, then processing continues to step 1018, wherein a call setup request is forwarded to the appropriate RCP as determined by the routing tables maintained within the current RCP.

If in step 1016 a determination is made that the network element servicing the terminating communications device has been reached or after step 1018, processing proceeds to step 1020. In step 1020, a quality service record is created and maintained by the RCP. If the session is being monitored by multiple RCPs, then each RCP preferably creates and maintains a quality service record.

In step 1022, a determination is made whether or not the route characteristics have changed. The route characteristics may include, for example, the route taken, the link status, the link capacity, service-level attributes, and the like. For example, a router or a link may fail, thereby requiring a different route to be taken by the message traffic. If a determination is made that the route characteristics have changed, then processing proceeds to step 1024, wherein the quality service record is modified accordingly.

In step 1024, a determination is made whether or not the session has been terminated. If the session has been terminated, then processing proceeds to step 1026, wherein the quality service record is closed for later use and analysis. Otherwise, processing returns to step 1020.

It should be noted that the process described above may be performed on each RCP in which a call is routed through one or more network elements with which the respective RCP communicates. Furthermore, it should also be noted that the process described above may be performed multiple times on a single RCP for both directions of a bi-directional session.

Figure 11:
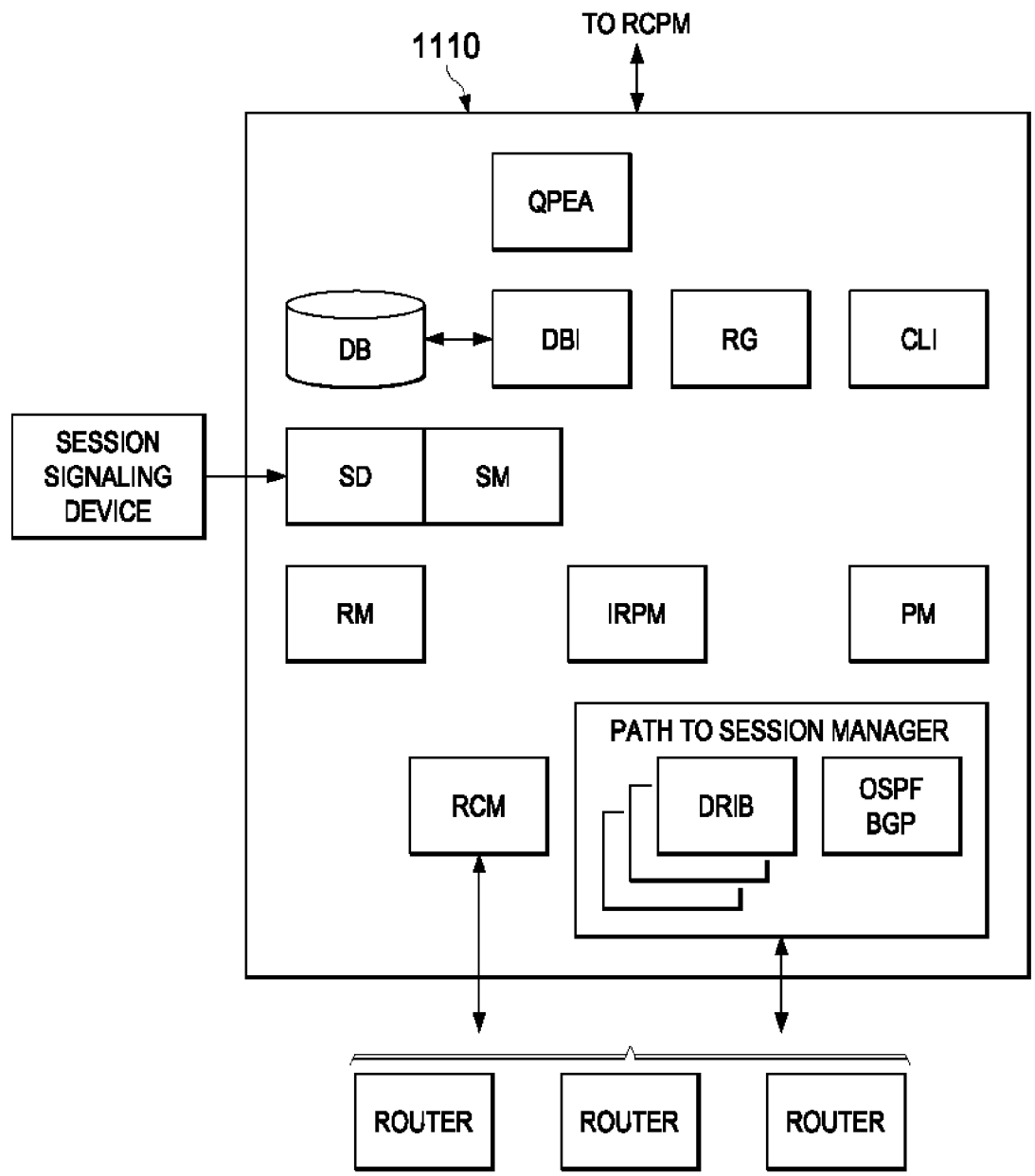
FIG. 11 is a software architecture diagram of a resource control point in accordance with an embodiment of the present invention.

FIG. 11 illustrates a software architecture chart for a RCP 1110 in accordance with an embodiment of the present invention. It should be noted that the software architecture discussed herein is provided for illustrative purposes only, and is provided only to provide an example of the functionality that may be included in the RCP 1110. One of ordinary skill in the art will realize that the software may be organized in many different ways.

As illustrated in FIG. 11, the RCP 1110 preferably includes a database interface (DBI) that provides an interface for other components in the system to either store or extract information about sessions to/from the database. A report generator (RG) extracts information from the database through the DBI interface and exports reports on the overall network and how sessions are using the network. A session distiller (SD) converts external information about call setup or call teardown from the network into an RCP-internal request to the session manager to set up of tear down a session. A session manager (SM) tracks active sessions in the RCP. The SM learns about sessions from the SD and converts session requests into requests to set up paths (PM) and to allocate resources (RM). A resource manager (RM) monitors the utilization of resources by sessions on individual network links across the network. An inter-RCP path manager (IRPM) tracks session paths across RCP domains, and if a session crosses from a routed domain managed by one RCP to a different domain managed by another RCP, the IRPM coordinates the communication. A path manager (PM) determines the path taken by the session across the routers. A router communication manager (RCM) communicates with individual routers to gather router-specific information not shared via the routing protocols such as interface names and static routes. A path-to-session manager includes Distributed Routing Information Base (DRIB) routing tables which mirror the routing tables of the routers within the RCP domain and OSPF/BGP routing protocol instances which populate the DRIB with routing information, and tracks sessions through the network on a router-by-router basis. The OSPF and BGP routing protocol instances determine BGP and OSPF routing information, which is populated into the per-router maintained DRIB routing tables. The DRIB routing tables are maintained for each router tracked by the RCP to allow the RCP to track sessions across the network. A query processing agent receives queries for session information from an optional RCP-Manager (RCP-M) and uses DBI to query the local system database for the requested information. The RCP 1110 may also include a command line interface (CLI) that allows a user to setup/maintain the RCP 1110.

Figure 12:
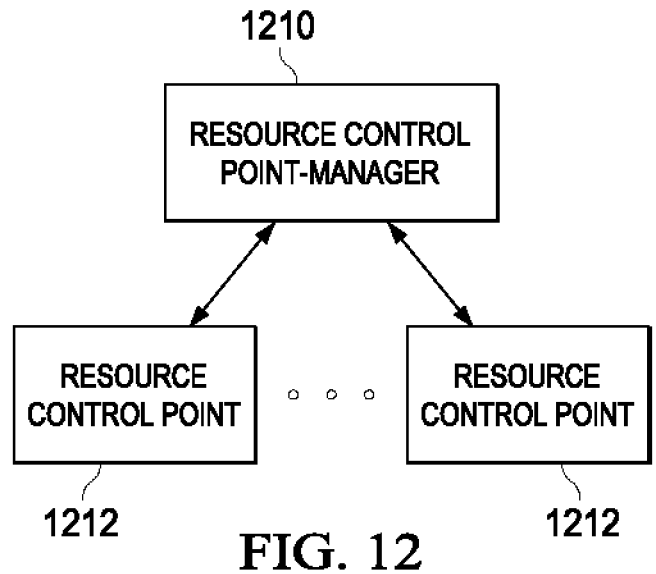
FIG. 12 is a network diagram having a resource control point manager in accordance with an embodiment of the present invention.

FIG. 12 illustrates a network diagram in an embodiment of the present invention that includes an optional resource control point-manager (RCP-M) 1210. In this embodiment, the RCP-M 1210 is interconnected to one or more RCPs, such as RCPs 1212 of FIG. 12. The RCP-M 1210 provides a consolidated management point to control, configure, and query the RCPs interconnected thereto. Preferably, the RCP-M 1210 provides a query function to provide a user a network-wide gateway into the information held about sessions on the RCPs within the network. For example, the RCP-M 1210 may allow a user to query the RCP-M 1210 about all of the sessions in the network at a specified time period. The RCP-M 1210 may also allow a user to query the RCP-M 1210 regarding a particular link and/or router. The RCP-M 1210 then communicates with the RCPs 1212 to obtain the information and provide the user with a report.

Figure 13:
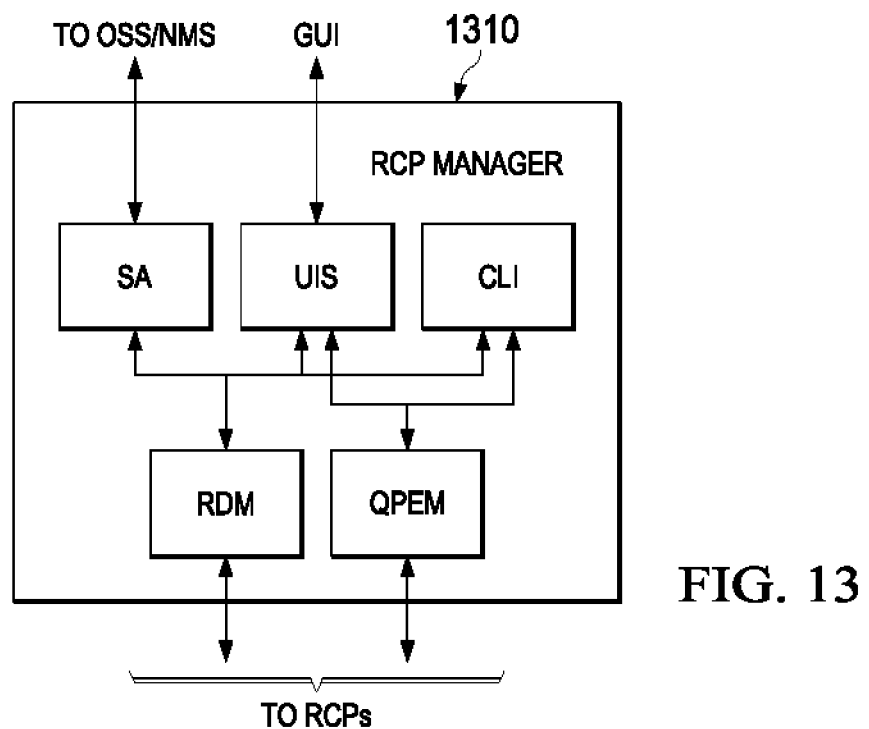
FIG. 13 is a software architecture diagram of a resource control point manager in accordance with an embodiment of the present invention.

FIG. 13 illustrates a software architecture chart for a RCP-M in accordance with an embodiment of the present invention. It should be noted that the software architecture discussed herein is provided for illustrative purposes only, and is provided only to provide an example of the functionality that may be included in the RCP 1310. One of ordinary skill in the art will realize that the software may be organized in many different ways.

In an embodiment, the RCP-M 1310 includes a user interface server (UIS) for communicating between the RCP-M 1310 and the graphical user interface (GUI) to process requests from and transmit results to the GUI. A query processing engine manager (QPEM) receives query requests for sessions and responds with a set of QSR records that match the query. For example, if a query requested all session that occurred between 10 AM and 11 AM on a particular day, the QPEM would find all such sessions and deliver the QSRs for those sessions to the party that originated the query.

A SNMP agent (SA) provides an interface to network management devices in the network that wish to communicate with the RCP-M. Through the SA, network management devices can extract information about events that have affected sessions. A command line interface (CLI) allows a user of the RCP or RCP-M to configure the system. A remote data manager (RDM) gathers information about sessions from the individual RCPs and provides the information to the QPEM, which utilizes the information to respond to query requests.

Figure 14:
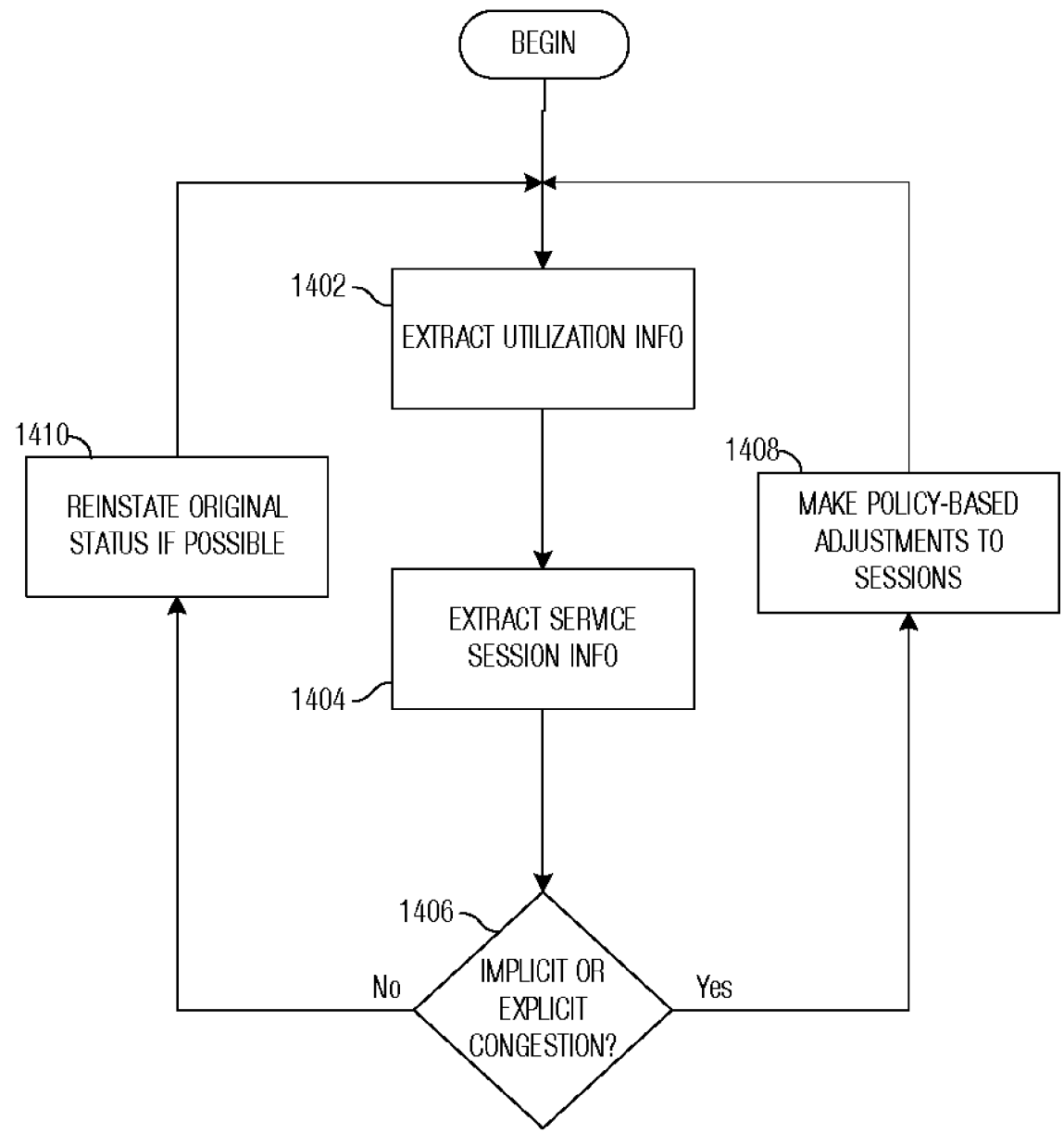
FIG. 14 is a flow diagram depicting steps that may be performed to monitor network usage and to adjust network traffic in accordance with an embodiment of the present invention.

FIG. 14 is a flow diagram illustrating an active network feedback service that may be provided using the network architecture discussed above in accordance with an embodiment of the present invention. The process begins in step 1402, wherein utilization information is extracted. The utilization information indicates the utilization levels of individual links, e.g., are the individual links congested. The utilization information may be obtained in any manner and from any suitable network element. For example, the utilization information may include data discussed above and that is already available in the RCP/RCP-M, data extracted by the RCP/RCP-M from the individual network elements using the techniques and protocols discussed, and/or, data retrieved from another network node such as a network management system. Generally, a network management system may be a hardware and/or software entity in the network that was directly communicating with the network elements, e.g., the switches and routers. In this embodiment, the RCP/RCP-M may communicate directly with the network management system to obtain additional utilization information. Examples of utilization information that may be obtained include the average rate in packets per second of aggregate traffic passing through a particular network link, the amount of traffic (packets per second) associated with a particular identified network application or class of traffic, the delay (latency) packets experience when travelling between two points in the network over a particular network link, the jitter experienced by network packets traversing a particular network link and the rate at which packets sent across a particular network link are discarded or experience errors.

Next, in step 1404, service session information is extracted. While the utilization information discussed above relates to the usage of the individual links for user and/or control traffic, the session information relates more to the individual sessions that may be using the individual links. Session information may include, among other things, session priority, quality of service requirements, bandwidth requirements, the type of session (e.g., voice or video or a specific network application like text messages), end-to-end latency requirements for the session in the network, aggregate acceptable maximum delay across the network for the session, and the like of the session.

The session information may be stored on the RCP/RCP-M or retrieved as discussed above with reference to the utilization information. Additionally, session information may be extracted from the call request message discussed above with reference to FIG. 3.

One of ordinary skill in the art will realize that the information collected above include three major types of data. First, bandwidth information is obtained that indicates how many packets per second are flowing between network elements in relation to the maximum allowable rate. Second, latency information that indicates how long it takes a packet to move across a network link from network device A to network device B is obtained. For example, if data is transmitted via an orbiting satellite, that traffic will experience much longer delay in moving between network device A and network device B than if the data had been transmitted over a land-based cable. Hence, the satellite traffic experiences a greater latency. Different applications in a network have different requirements as far as maximum delay. Third, jitter information is obtained. Jitter information relates to the variation in time between packets arriving at a point in the network. Generally, the lower the jitter, the better the quality of the session. For traffic such as voice and video traffic, it is desirable that the traffic arrive in a predictable time interval basis.

Thereafter, in step 1406, a decision is made whether or not a particular link is congested. Congestion may be explicitly detected or implicitly detected. In the case of explicit congestion, the RCP/RCP-M may communicate directly with the network elements and/or a network management system using messages sent via, for example, SNMP, a CLI, an XML, or the like to obtain the information indicating a link congestion condition.

In the case of implicit congestion, the RCP/RCP-M monitors the session activity as described above. As a result, the RCP/RCP-M is aware of how many sessions, and the associated bandwidth requirements, are utilizing any particular link at any particular point in time. By evaluating and analyzing the session information maintained by the RCP/RCP-M, the RCP/RCP-M may determine by itself that a link is congested.

If a decision is made that a link is congested, then processing proceeds to step 1408, wherein service sessions may be preempted or terminated. When a link is determined to be congested, the RCP/RCP-M knows which sessions are related to the congested link, and based upon the policy-based rules, one or more sessions may be preempted or terminated. The policy-based rules may be any suitable rule for determining which one(s) of sessions utilizing a congested link is (are) to be preempted or terminated.

One example of a policy-based rule is based simply on the session priority, such as preempting or terminating the lowest priority session. In other examples, the priority of a session may be combined with other factors, such as bandwidth requirements, frequency, quality of service constraints, and the like.

It should be noted that the session priority may be derived by applying one or more rules. For example, the RCP/RCP-M may apply a rule to a particular user that, if the user uses the communications network between 5 PM and 10 PM on a Sunday night, the user is granted a higher priority than otherwise.

If, on the other hand, a decision is made in step 1406 that a link is not congested, then processing proceeds to step 1410, wherein the sessions that were preempted may be reinitiated. The process discussed above may be repeated and performed continuously or periodically as desired to maintain network health.

It should also be noted that the process described above may be performed in the RCP, RCP-M, or some combination of the two. Preferably, however, the RCP acts as a data collector to collect information from the various network elements within the relevant network domain. The RCP may either make perform the process described above and make the decisions and issue the commands locally, or transmit the information to the RCP-M, which may collect information from one or more RCPs and then make the decisions. In an embodiment in which the RCP-M performs the decision making process, the RCP-M may evaluate the sessions in the network from a global perspective. For example, a session may have the highest priority of sessions in a first domain, but have the lowest priority of sessions in a second domain. In this case, it may be desirable to shut down or preempt the session, even though it means that a lower priority session would be allowed in the first domain, since the session may be shut down or preempted in the second domain.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the functionality described herein may be performed by fewer or more varied components while remaining within the scope of the present invention. Additionally, one skilled in the art will realize that the type of information gathered, retrieved, and stored may vary while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications network comprising: a plurality of network elements in a first domain, each network element configured to route traffic through the respective network element, each network element being communicatively coupled to at least one other network element via a plurality of links; and a control point communicatively associated with the first domain and coupled to the plurality of network elements to receive utilization and session information, the control point configured to generate and maintain an resource control point (RCP) routing table of routings of the plurality of network elements and routings between domains and configured to calculate sub-path routings through the first domain for call requests based on the RCP routing table, the control point further configured to detect a congested link of a route within the first domain and to instruct one or more of the network elements to terminate or preempt one or more sessions on the congested link, the control point not being on a network element in the route the control point further configured to communicate with a second control point associated with a second domain.

2. The communications network of claim 1, wherein the communications network is an IP network.

3. The communications network of claim 1, wherein the control point is a resource control point communicatively coupled to a plurality of resource control points.

4. The communications network of claim 1, wherein the control point obtains some session information from a call setup request.

5. The communications network of claim 4, wherein the control point is configured to passively monitor traffic from a signaling session device for a call setup request.

6. The communications network of claim 4, further comprising a signaling session device configured to transmit to the control point the call setup request.

7. The communications network of claim 1, wherein the control point is configured to maintain a list of sessions in the first domain, and wherein the congested link is explicitly determined by the control point through the control point monitoring the list of sessions.

8. The communications network of claim 1, wherein the congested link is implicitly determined by the control point though the control point obtaining information on link congestion conditions from the plurality of network elements.

9. The communication network of claim 1, wherein each of the plurality of network elements are further configured to include the control point in a network element routing table and update the control point with changes to the routing table.

10. The communication network of claim 1, wherein the control point is further configured to receive information associated with routings of the plurality of network elements using a first communications protocol and to receive information associated with routings between domains using a second communications protocol different than the first communications protocol.

11. A computer program product for providing session control in a communications network, the computer program product having a non-transitory computer readable medium with a computer program embodied thereon, the computer program comprising:
   computer program code for retrieving utilization information from a plurality of network elements;
   computer program code for generating, by a control point not involved in call routing, session information from call requests, and for storing the session information at the control point;
   computer code for generating and maintaining quality service records and for modifying the quality service records in response to a change in route characteristics of at least one of the plurality of network elements;
   computer program code for determining, by the control point, if a link coupled to one or more of the plurality of network elements is congested based on the session information, the link not being directly coupled to the control point; and
   computer program code for instructing at least one of the plurality of network elements to preempt or terminate a session, based at least in part on the session information, if a determination is made by the control point that the link carrying the session is congested.

12. The computer program product of claim 11, further comprising computer program code to instruct the at least one of the plurality of network elements to reinstate the session.

13. The computer program product of claim 11, further comprising computer program code for communicating to a network management node using SNMP.

14. A method of controlling a communications network, the method comprising:
   obtaining session information from a plurality of network routers;
   storing the session information for a plurality of sessions at a control point;
   determining, by the control point not involved in call routing, a communications link is congested based on a number of sessions in the plurality of sessions and resource requirement information in the session information, the communications link not being directly coupled to the control point; and
   upon determining a communications link is congested, instructing at least one of the plurality of network routers to preempt or terminate one or more sessions utilizing the communications link based on at least the session information.

15. The method of claim 14, wherein the determining a communications link is congested is performed at least in part by deriving a link congestion condition based upon the session information and link information.

16. The method of claim 14, further comprising, upon determining the communications link is no longer congested, instructing the at least one of the plurality of network routers to reinstate the session.

17. The method of claim 14, further comprising:
   including the control point in a routing table of the network routers; and
   updating the control point with changes to the routing table.

* * * * *